(12) United States Patent
Harada

(10) Patent No.: US 12,463,253 B2
(45) Date of Patent: Nov. 4, 2025

(54) NONAQUEOUS ELECTROLYTE SOLUTION SECONDARY BATTERY

(71) Applicant: GS Yuasa International Ltd., Kyoto (JP)

(72) Inventor: Ryo Harada, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 875 days.

(21) Appl. No.: 17/290,139

(22) PCT Filed: Oct. 31, 2019

(86) PCT No.: PCT/JP2019/042847
§ 371 (c)(1),
(2) Date: Apr. 29, 2021

(87) PCT Pub. No.: WO2020/090986
PCT Pub. Date: May 7, 2020

(65) Prior Publication Data
US 2021/0328267 A1    Oct. 21, 2021

(30) Foreign Application Priority Data

Nov. 1, 2018 (JP) .................................. 2018-206408
Mar. 12, 2019 (JP) .................................. 2019-044950

(51) Int. Cl.
*H01M 10/0569* (2010.01)
*H01M 4/02* (2006.01)
(Continued)

(52) U.S. Cl.
CPC ....... *H01M 10/0569* (2013.01); *H01M 4/133* (2013.01); *H01M 10/0525* (2013.01);
(Continued)

(58) Field of Classification Search
None
See application file for complete search history.

(56) References Cited

U.S. PATENT DOCUMENTS

2012/0214043 A1   8/2012   Olschimke et al.
2013/0108933 A1*  5/2013   Garcia-Juan .......... H01M 12/02
                                                         429/332
(Continued)

FOREIGN PATENT DOCUMENTS

CN   107181004 A    9/2017
JP   2005-108724 A  4/2005
(Continued)

OTHER PUBLICATIONS

International Search Report (ISR) dated Jan. 21, 2020 filed in PCT/JP2019/042847.
(Continued)

*Primary Examiner* — Eli S Mekhlin
(74) *Attorney, Agent, or Firm* — RANKIN, HILL & CLARK LLP

(57) ABSTRACT

A nonaqueous electrolyte solution secondary battery according to one aspect of the present invention is a nonaqueous electrolyte solution secondary battery including a positive electrode and a nonaqueous electrolyte solution. The positive electrode contains a sulfur-mesoporous carbon composite that is a composite of a sulfur-based active material and mesoporous carbon. The nonaqueous electrolyte solution contains a fluorinated solvent. The fluorinated solvent contains a chain fluorinated carbonate, a chain fluorinated carboxylic acid ester, or a combination thereof.

19 Claims, 2 Drawing Sheets

(51) Int. Cl.
 H01M 4/133 (2010.01)
 H01M 10/0525 (2010.01)
(52) U.S. Cl.
 CPC ............... *H01M 2004/028* (2013.01); *H01M 2300/0034* (2013.01)

(56) References Cited

U.S. PATENT DOCUMENTS

| | | | |
|---|---|---|---|
| 2014/0302402 A1* | 10/2014 | Chen | H01M 4/505 |
| | | | 429/333 |
| 2015/0072248 A1 | 3/2015 | Watanabe et al. | |
| 2018/0183101 A1 | 6/2018 | Mizutani et al. | |
| 2018/0287120 A1 | 10/2018 | Nakajima et al. | |
| 2018/0294506 A1 | 10/2018 | Nakajima et al. | |
| 2018/0331352 A1* | 11/2018 | Morales Palomino | H01M 4/1393 |
| 2020/0036043 A1 | 1/2020 | Ishikawa et al. | |
| 2020/0295354 A1* | 9/2020 | Lee | H01M 4/38 |

FOREIGN PATENT DOCUMENTS

| | | | |
|---|---|---|---|
| JP | 2006-32143 A | 2/2006 | |
| JP | 2010-95390 A | 4/2010 | |
| JP | 2013-508927 A | 3/2013 | |
| JP | 2013-225497 A | 10/2013 | |
| JP | 2014-225369 A | 12/2014 | |
| JP | 2018-67501 A | 4/2018 | |
| JP | 2018-106964 A | 7/2018 | |
| WO | WO-2012092210 A1 * | 7/2012 | ........... C01B 32/318 |
| WO | 2017/064843 A1 | 4/2017 | |
| WO | 2018/163778 A1 | 9/2018 | |

OTHER PUBLICATIONS

Torii et al., "Effect of fluorinated solvent-based electrolyte and improvement of rate performance in lithium-sulfur battery", Abstracts of the 58th Battery Symposium in Japan, 2017, p. 279, 1E16; English abstract included; Discussed in Specification.

* cited by examiner

NONAQUEOUS ELECTROLYTE SOLUTION SECONDARY BATTERY

TECHNICAL FIELD

The present invention relates to a nonaqueous electrolyte solution secondary battery.

BACKGROUND ART

Nonaqueous electrolyte solution secondary batteries represented by lithium ion secondary batteries have high energy density and high power density, and are therefore widely used in electronic devices such as personal computers and communication terminals, automobiles, and the like.

Lithium transition metal composite oxides such as $LiCoO_2$, $LiNiO_2$, $LiMn_2O_4$, and $LiNi_{1/3}Co_{1/3}Mn_{1/3}O_2$ have been put into practical use as positive electrode materials for lithium ion secondary batteries, but these materials have a limited capacity per mass. Thus, in order to achieve a nonaqueous electrolyte solution secondary battery having a higher energy density, sulfur is being studied as a positive electrode material in place of the lithium transition metal composite oxide. Sulfur has a theoretical capacity of 1675 $mAhg^{-1}$ per mass and has an energy density more than 6 times the theoretical capacity of conventional positive electrode materials.

However, in a nonaqueous electrolyte solution secondary battery using sulfur as the positive active material, lithium polysulfide $Li_2S_x$ ($4 \leq x \leq 8$), forming a part of the composition that is an intermediate product generated during charge-discharge, is soluble in a nonaqueous electrolyte solution, whereby there is a problem in that, after charge-discharge is repeated, sulfur is eluted as lithium polysulfide in the nonaqueous electrolyte solution, and the capacity is reduced.

To address this, a technique for improving the capacity decrease by adjusting the components of the nonaqueous electrolyte solution has been proposed.

Non-Patent Document 1 discloses the use of 1 $moldm^{-3}$ LiTFSI (lithium bis(trifluoromethanesulfonyl)imide)/FEC (fluoroethylene carbonate): D2 (1,1,2,2-tetrafluoroethyl-2,2,3,3-tetrafluoropropyl ether) as a nonaqueous electrolyte solution in a lithium ion secondary battery containing sulfur as a positive active material.

Patent Document 1 discloses a nonaqueous electrolyte solution secondary battery including a positive electrode containing a carbon composite material containing a carbon material having a pore volume ratio (micropore/mesopore) of 2.1 and sulfur, and a nonaqueous electrolyte solution obtained by mixing $HF_2CCF_2CH_2OCF_2CF_2H$ and FEC to have a composition of 60:40 in a nonaqueous electrolyte solution and then adding LiTFSI to the mixture so as to achieve a concentration of 1.0 mol/liter.

PRIOR ART DOCUMENTS

Non-Patent Documents

Non-Patent Document 1: Abstracts of the 58th Battery Symposium, 1E16 (2017)
Patent Document 1: International Publication No. WO 2018/163778

SUMMARY OF THE INVENTION

Problems to be Solved by the Invention

Neither the secondary battery disclosed in Non-Patent Document 1 nor the secondary battery disclosed in Patent Document 1 can sufficiently suppress the capacity decrease due to repeated charge-discharge. Thus, there has been a demand for a nonaqueous electrolyte solution secondary battery containing a sulfur-based active material that can maintain its capacity even after repeated charge-discharge.

An object of the present invention is to provide a nonaqueous electrolyte solution secondary battery including a positive electrode containing a sulfur-based active material having a high capacity retention rate after charge-discharge is repeated.

Means for Solving the Problems

One aspect of the present invention made to achieve the above object is a nonaqueous electrolyte solution secondary battery including a positive electrode and a nonaqueous electrolyte solution. The positive electrode contains a sulfur-mesoporous carbon composite that is a composite of a sulfur-based active material and mesoporous carbon. The nonaqueous electrolyte solution contains a fluorinated solvent. The fluorinated solvent contains a chain fluorinated carbonate, a chain fluorinated carboxylic acid ester, or a combination thereof.

Advantages of the Invention

According to the present invention, it is possible to provide a nonaqueous electrolyte solution secondary battery including a positive electrode containing a sulfur-based active material having a high capacity retention rate after charge-discharge is repeated.

MODE FOR CARRYING OUT THE INVENTION

Figure 1:
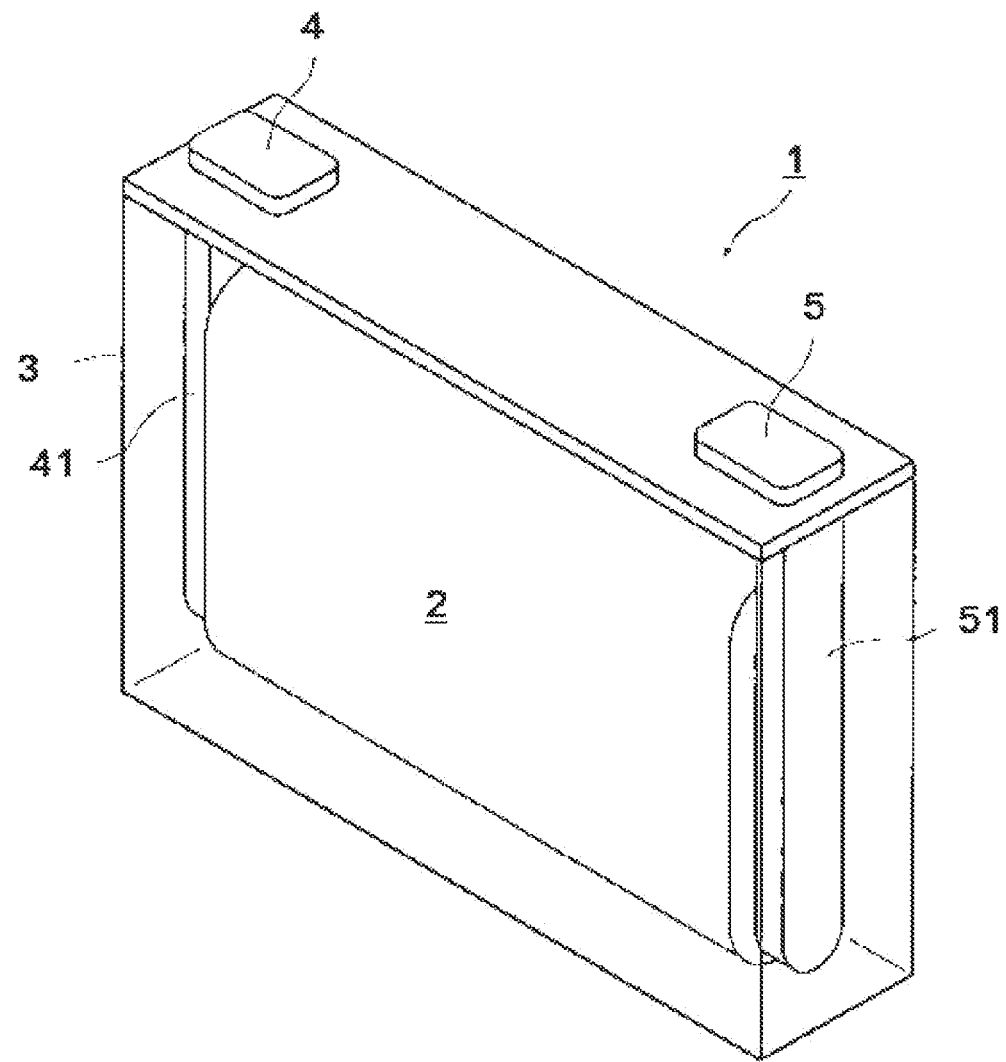
FIG. 1 is an external perspective view illustrating an embodiment of a nonaqueous electrolyte solution secondary battery.

First, the outline of a nonaqueous electrolyte solution secondary battery disclosed in the present specification will be described.

A nonaqueous electrolyte solution battery according to one aspect of the present invention is a nonaqueous electrolyte solution secondary battery including a positive electrode and a nonaqueous electrolyte solution. The positive electrode contains a sulfur-mesoporous carbon composite that is a composite of a sulfur-based active material and mesoporous carbon. The nonaqueous electrolyte solution contains a fluorinated solvent. The fluorinated solvent contains a chain fluorinated carbonate, a chain fluorinated carboxylic acid ester, or a combination thereof.

With this configuration, it is possible to increase the capacity retention rate after charge-discharge is repeated.

The reason for this is not clear, but the following can be presumed, for example.

The chain fluorinated carbonate and the chain fluorinated carboxylic acid ester are less likely to be reduced and decomposed than a fluorinated ether and the like. Thus, it is considered that the nonaqueous electrolyte solution secondary battery can suppress the decomposition of the fluorinated solvent at the negative electrode.

Further, the chain fluorinated carbonate and the chain fluorinated carboxylic acid ester are more likely to be oxidized and decomposed than the fluorinated ether and the like. Thus, it is considered that a surface film is easily formed at the interface between the sulfur-based active material and the nonaqueous electrolyte solution, and the elution of lithium polysulfide can be suppressed.

Furthermore, mesoporous carbon has a larger pore diameter than that of microporous carbon. Thus, it is considered that the contact area between the surface film formed on the surface of the sulfur-based active material and the nonaqueous electrolyte solution increases, whereby the transport of carrier ions in the surface film becomes smooth.

It is considered that such a phenomenon brings about a synergistic effect and can increase the capacity retention rate after charge-discharge is repeated.

Here, the total content rate of the chain fluorinated carbonate and the chain fluorinated carboxylic acid ester in the nonaqueous electrolyte solution may be 20% by volume or more.

With this configuration, the effect of the present invention for increasing the capacity retention rate after charge-discharge is repeated can be more reliably exhibited.

Here, the fluorinated solvent may contain a cyclic fluorinated carbonate.

With this configuration, the output characteristics of the nonaqueous electrolyte solution secondary battery can be improved.

Here, the nonaqueous electrolyte solution may contain a non-fluorinated solvent.

With this configuration, it is possible to increase the capacity retention rate after charge-discharge is repeated.

The reason for this is not clear, but the following can be presumed, for example.

The non-fluorinated solvent is more likely to react with lithium polysulfide than the chain fluorinated carbonate and the chain fluorinated carboxylic acid ester. Thus, it is considered that a surface film is easily formed on the surface of the sulfur-based active material, elution of lithium polysulfide is suppressed, and such an effect can be obtained.

Here, the content rate of the non-fluorinated solvent in the nonaqueous electrolyte solution may be 1% by volume or more and 40% by volume or less.

With this configuration, it is possible to increase the capacity retention rate after charge-discharge is repeated.

Here, the non-fluorinated solvent may contain a non-fluorinated organic compound containing a C=O double bond in its molecular structure.

With this configuration, it is possible to increase the capacity retention rate after charge-discharge is repeated.

The reason for this is not clear, but the following can be presumed, for example.

Non-fluorinated organic compounds containing C=O double bonds are particularly likely to react with lithium polysulfide. When a nonaqueous electrolyte solution containing such a non-fluorinated organic compound is used, it is considered that a surface film is surely formed on the surface of the sulfur-based active material. As a result, it is considered that the elution of sulfur is suppressed and the retention rate of the discharge capacity can be increased after charge-discharge is repeated.

Here, the content rate of the chain fluorinated ether in the fluorinated solvent may be 0% by volume or more and 15% by volume or less.

As a result, the effect of increasing the capacity retention rate after charge-discharge is repeated can be surely exhibited.

Here, the fluorinated solvent may contain a chain fluorinated ether, and the content rate of the chain fluorinated ether in the fluorinated solvent may be 5% by volume or more and 15% by volume or less.

With this configuration, it is possible to increase the discharge capacity at the initial stage of the charge-discharge cycle while increasing the capacity retention rate after charge-discharge is repeated.

The reason for this is not clear, but the following can be presumed, for example.

The chain fluorinated ether has higher oxidation resistance and lower reduction resistance than the chain fluorinated carbonate and the chain fluorinated carboxylic acid ester. Thus, it is considered that when the nonaqueous electrolyte solution contains 5% by volume or more and 15% by volume or less of the chain fluorinated ether, the reactivity of the fluorinated solvent at the positive electrode is moderately lowered without significantly impairing the reduction resistance, whereby the oxidative decomposition of the fluorinated solvent can be suppressed. With this mechanism, it is possible to increase the discharge capacity at the initial stage of the charge-discharge cycle while increasing the capacity retention rate after charge-discharge is repeated.

Hereinafter, a configuration and manufacturing method of a nonaqueous electrolyte solution secondary battery (hereinafter, also simply referred to as "battery") according to one embodiment of the present invention will be described in detail, using a lithium secondary battery (hereinafter, simply referred to as "lithium battery") as an example. The name of each constituent element used in each embodiment may be different from the name of the corresponding constituent element used in the background art.

<Nonaqueous Electrolyte Solution Secondary Battery>

The battery according to one embodiment of the present invention includes a positive electrode, a negative electrode, and a nonaqueous electrolyte solution.

(Positive Electrode)

The positive electrode includes a positive electrode substrate and a positive composite layer arranged directly on the positive electrode substrate or via an intermediate layer.

The positive electrode substrate has conductivity. As the material of the positive electrode substrate, metals such as aluminum, titanium, tantalum, and stainless steel, or alloys thereof are used. Among these, aluminum or an aluminum alloy is preferable from the viewpoint of potential resistance, high conductivity, and cost. Examples of the positive electrode substrate include foil, deposition films, and the like, and foil is preferable from the viewpoint of cost. Thus, aluminum foil or aluminum alloy foil is preferable as the positive electrode substrate. Examples of the aluminum or aluminum alloy include A1085P, A3003P, and the like specified in JIS-H-4000 (2014).

The lower limit of the average thickness of the positive electrode substrate is preferably 5 µm and more preferably 10 µm. The upper limit of the average thickness of the positive electrode substrate is preferably 50 µm and more preferably 40 µm. The average thickness of the positive electrode substrate at and above the above-described lower limit can increase the strength of the positive electrode substrate. The average thickness of the positive electrode substrate at and below the above-described upper limit can increase the energy density per volume of the battery. The "average thickness" means the average value of the thickness measured at any ten points. This definition similarly applies when the "average thickness" is used for other members and the like.

The intermediate layer is a layer disposed between the positive electrode substrate and the positive composite layer. The intermediate layer contains conductive particles such as carbon particles to reduce the contact resistance between the positive electrode substrate and the positive composite layer. The composition of the intermediate layer is not particularly limited, and includes, for example, a resin binder and conductive particles. Being "conductive" means that the volume resistivity measured in accordance with JIS-H-0505 (1975) is $10^7$ Ω·cm or less, and being "non-conductive" means that the volume resistivity above is over $10^7$ Ω·cm.

The positive composite layer contains a positive active material. The positive composite layer contains optional elements such as a conductive agent, a binder (binding agent), a thickener, and a filler, if necessary.

The positive electrode according to the present invention contains a sulfur-mesoporous carbon composite that is a composite of a sulfur-based active material and mesoporous carbon. The term "composite" as used herein means that the sulfur-based active material is immobilized on the surface of the conductive material to the extent that the sulfur-based active material does not separate from the conductive material.

Examples of the sulfur-based active material include elemental sulfur, metal sulfide, organic sulfur compounds, and the like. Examples of the metal sulfide include $Li_2S_x$ (1≤x≤8), $MS_x$ (M=Ni, Co, Cu, Fe, Mo, Ti, 1≤x≤4), and the like. Examples of the organic sulfur compounds include an organic disulfide compound and the like.

As used herein, the mesoporous carbon means a porous carbon having a mesoporous volume larger than the microporous volume.

The mesoporous volume and the microporous volume are calculated by a gas adsorption method. Details of the method are as follows. A porous carbon sample is dried at 120° C. overnight. Then, the adsorption-desorption isotherm of nitrogen gas at 77 K of this sample is measured. The pore distribution is calculated by the BJH method and the MP method from the desorption isotherm of the adsorption-desorption isotherm measured. The pore volume derived from pores having a diameter of 2 nm or more and 50 nm or less obtained from calculation results by the BJH method is defined as the mesoporous volume. The pore volume derived from pores having a diameter of less than 2 nm obtained from calculation results by the MP method is defined as the microporous volume.

To recover the porous carbon sample from the positive electrode taken out by disassembling the nonaqueous electrolyte solution secondary battery, preparation is made according to the following procedure. First, constant current charge of the nonaqueous electrolyte solution secondary battery is performed with a current of 0.05 C. Constant current charge is performed up to a voltage at which the potential of the positive electrode is 3V (vs. Li/Li$^+$). Next, constant voltage charge is performed until the current value decreases to 0.02 C. Then, the nonaqueous electrolyte solution secondary battery is disassembled and the positive electrode is taken out. The positive electrode taken out is washed with DMC (dimethyl carbonate), dried at room temperature for 24 hours, and then the positive composite is recovered. The sulfur-porous carbon composite is taken out by washing this positive composite with water. Through heat treatment of this sulfur-porous carbon at 200° C., a porous carbon sample to be used for measurement is obtained.

The content rate of the sulfur-based active material in the sulfur-mesoporous carbon composite is preferably 50% by mass or more and 95% by mass or less. This rate makes it possible to increase the electron conductivity, while the energy density of the sulfur-mesoporous carbon composite is increased.

The total pore volume per unit mass of the mesoporous carbon is preferably 1 time or more and 2 times or less the volume density of the sulfur-based active material in the discharged state. For example, when elemental sulfur having a volume density of 0.9 $cm^3g^{-1}$ at the time of charge is used as a sulfur-based active material and the content rate of the elemental sulfur in the sulfur-mesoporous carbon composite is 50% by mass, the total pore volume per unit mass is preferably 0.9 $cm^3g^{-1}$ or more and 1.8 $cm^3g^{-1}$ or less. As a result, sulfur can be sufficiently retained in the pores, while the energy density of the sulfur-mesoporous carbon composite is increased.

The mesoporous volume per unit mass of mesoporous carbon is preferably 0.50 $cm^3g^{-1}$ or more and 2.0 $cm^3g^{-1}$ or less, more preferably 0.60 $cm^3g^{-1}$ or more and 1.8 $cm^3g^{-1}$ or less, and further preferably 0.70 $cm^3g^{-1}$ or more and 1.5 $cm^3g^{-1}$ or less. As a result, it is possible to suppress a decrease in the bulk density of the positive composite, while the energy density of the sulfur-mesoporous carbon composite is increased.

The microporous volume per unit mass of mesoporous carbon is preferably 0.18 $cm^3g^{-1}$ or more and 0.50 $cm^3g^{-1}$ or less, more preferably 0.24 $cm^3g^{-1}$ or more and 0.44 $cm^3g^{-1}$ or less, and further preferably 0.30 $cm^3g^{-1}$ or more and 0.38 $cm^3g^{-1}$ or less. As a result, it is possible to suppress a decrease in the bulk density of the positive composite, while the energy density of the sulfur-mesoporous carbon composite is increased.

The ratio of the mesoporous volume to the microporous volume of the mesoporous carbon may be such that the lower limit is 1.0 or more, more preferably 1.5 or more, and further preferably 2.0 or more. As a result, in the sulfur-mesoporous carbon composite, the contact area between the surface film formed on the surface of the sulfur-based active material and the nonaqueous electrolyte solution can be increased. The upper limit of the ratio of the mesoporous volume to the microporous volume is not particularly limited, but may be 10 or less, for example. This ratio makes it possible to increase the electron conductivity of the sulfur-based active material in the sulfur-mesoporous carbon composite.

The mesoporous carbon preferably has a peak in the range of 1.0 nm to 6.0 nm in the log differential pore volume distribution. As a result, the size of sulfur-based active material particles supported in the pores can be reduced, while the permeability of the electrolyte solution into the pores is increased.

The mesoporous carbon preferably has a single peak in the log differential pore volume distribution. As a result, the particle size of sulfur-based active material particles in the sulfur-mesoporous carbon composite becomes uniform, and the utilization factor of the sulfur-based active material can be increased.

The mesoporous carbon preferably has a half width of the peak, in the log differential pore volume distribution, of 1.0 nm or more and 2.5 nm or less. As a result, the particle size of sulfur-based active material particles in the sulfur-mesoporous carbon composite becomes uniform, and the utilization factor of the sulfur-based active material can be increased.

The average pore diameter of the mesoporous carbon is preferably 0.5 nm or more and 15 nm or less, more preferably 0.7 nm or more and 10 nm or less, and further preferably 1.0 nm or more and 6.0 nm or less. The average pore diameter used herein means a value obtained by dividing the total pore volume calculated by the BJH method by a BET specific surface area.

By setting the average pore diameter to these lower limits or more, the size of the sulfur-based active material particles contained in the sulfur-mesoporous carbon composite can be reduced, whereby the ionic conductivity and the electron conductivity can be enhanced. By setting the average pore diameter to these upper limits or less, the permeability of the nonaqueous electrolyte solution into the pores of the sulfur-mesoporous carbon composite can be enhanced.

The BET specific surface area of mesoporous carbon is preferably 1000 $m^2g^{-1}$ or more and 4000 $m^2g^{-1}$ or less, more preferably 1500 $m^2g^{-1}$ or more and 3500 $m^2g^{-1}$ or less, and further preferably 2000 $m^2g^{-1}$ or more and 3000 $m^2g^{-1}$ or less. As a result, the contact area between the sulfur-based active material and the mesoporous carbon can be increased. In addition, the contact area between the sulfur-based active material contained in the sulfur-mesoporous carbon composite and the nonaqueous electrolyte solution can be increased.

The mesoporous carbon may be any porous carbon having a mesoporous volume larger than the microporous volume, and its shape and size are not particularly limited.

The positive electrode in one embodiment of the present invention may include an active material other than the sulfur-based active material in addition to the sulfur-based active material. As such an active material, known positive active materials can be selected as appropriate. Specific examples thereof include lithium transition metal composite oxides, transition metal oxides, polyanionic compounds, and the like.

(Optional Elements)

The positive composite layer may contain a conductive agent. With the conductive agent included, the electron conductivity of the positive composite layer can be enhanced. The conductive agent is not particularly limited as long as it has conductivity. Examples of such a conductive agent include: graphite; carbon black such as furnace black and acetylene black; metals; conductive ceramics and the like. Examples of the form of the conductive agent include powder, fibrous, and the like. Among these, acetylene black is preferable from the viewpoint of electron conductivity and coatability.

The lower limit of the content of the conductive agent in the positive composite layer is preferably 1% by mass, and more preferably 3% by mass. The upper limit of the content of the conductive agent is preferably 15% by mass, and more preferably 10% by mass. By setting the content of the conductive agent in the above range, the electric capacity of the battery can be increased.

When a sulfur-porous carbon composite is used, the porous carbon also functions as a conductive agent. Thus, by using the sulfur-porous carbon composite, it is expected that good electron conductivity can be exhibited even when the above-described conductive agent is not contained in the positive composite layer. The sulfur-porous carbon composite and the conductive agent may be used in combination.

When the porous carbon and the conductive agent are used in combination, the upper limit of the total content of the porous carbon and the conductive agent in the positive composite layer is preferably 40% by mass, and more preferably 30% by mass.

As the binder in the positive composite layer, a binder that can fix the positive active material and the like and is electrochemically stable in the range of use is typically used. As the binder, an aqueous binder may be used, or a nonaqueous binder may be used.

The aqueous binder is a binder that is dispersed or dissolved in water. Among these, a binder at least 1 part by mass of which dissolves in 100 parts by mass of water at 20° C. is preferable as the aqueous binder. Examples of the aqueous binder include polyethylene oxide (polyethylene glycol), polypropylene oxide (polypropylene glycol), polyvinyl alcohol, polyacrylic acid, polymethacrylic acid, polytetrafluoroethylene (PTFE), styrene butadiene rubber (SBR), polyethylene (PE), polypropylene (PP), polyethylene imine (PEI), nitrile-butadiene rubber, cellulose, and the like.

The nonaqueous binder is a binder that is dispersed or dissolved in a nonaqueous solvent such as N-methylpyrrolidone (NMP). Among these, a binder at least 1 part by mass of which dissolves in 100 parts by mass of NMP at 20° C. is preferable as the nonaqueous binder. Examples of the nonaqueous binder include polyvinylidene fluoride (PVDF), a copolymer of vinylidene fluoride and hexafluoropropylene (PVDF-HFP), a copolymer of ethylene and vinyl alcohol, polyacrylonitrile, polyphosphazene, polysiloxane, polyvinyl acetate, polymethylmethacrylate (PMMA), polystyrene, polycarbonate, polyamide, polyimide, polyamideimide, a crosslinked polymer of cellulose and chitosanpyrrolidone carboxylate, a derivative of chitin or chitosan, and the like.

When a binder is used, an aqueous binder forms paste in which water serves as a dispersion medium, and a nonaqueous binder forms paste in which a nonaqueous solvent serves as a dispersion medium. The paste formed is applied to and dried on the positive electrode substrate to form a positive composite layer. Here, since the sublimation temperature of sulfur is about 180° C., it is preferable to use a solvent having a boiling point lower than 180° C. as the dispersion medium of the paste. As the solvent having a boiling point lower than 180° C., it is particularly preferable to use water, which has a low boiling melting point and is easy to handle. For these reasons, it is preferable to use an aqueous binder as the binder.

The lower limit of the content of the binder in the positive composite layer is preferably 1% by mass, and more preferably 3% by mass. The upper limit of the content of the binder is preferably 15% by mass, and more preferably 10% by mass. By setting the content of the binder in the above range, the active material can be stably fixed.

Examples of the thickener include polysaccharide polymers such as carboxymethyl cellulose (CMC) and methyl cellulose. When the thickener has a functional group that reacts with lithium or the like, this functional group may be deactivated by methylation or the like in advance.

The filler is not particularly limited. Examples of the filler include polyolefins such as polypropylene and polyethylene, silica, alumina, zeolite, glass, alumina silicate, and the like.

The positive composite layer may contain a typical non-metal element such as B, N, P, F, Cl, Br, and I, a typical metal element such as Li, Na, Mg, Al, K, Ca, Zn, Ga, and Ge, and a transition metal element such as Sc, Ti, V, Cr, Mn, Fe, Co, Ni, Cu, Mo, Zr, Nb, and W as components other than the positive active material, the conductive agent, the binder, the thickener, and the filler.

(Negative Electrode)

The negative electrode includes a negative electrode substrate and a negative composite layer arranged directly on the negative electrode substrate or via an intermediate layer. The composition of the intermediate layer is not particularly limited, and can be selected from the compositions exemplified for the positive electrode, for example.

The negative electrode substrate has conductivity. As the material of the negative electrode substrate, metals such as copper, nickel, stainless steel, nickel-plated steel, and aluminum, or alloys thereof are used. Among these, copper or a copper alloy is preferable. Examples of the negative electrode substrate include foil, deposition films, and the like, and foil is preferable from the viewpoint of cost. Thus, copper foil or copper alloy foil is preferable as the negative electrode substrate. Examples of the copper foil include rolled copper foil, electrolytic copper foil, and the like.

The lower limit of the average thickness of the negative electrode substrate is preferably 3 μm and more preferably 5 μm. The upper limit of the average thickness of the negative electrode substrate is preferably 30 μm and more preferably 20 μm. The average thickness of the negative electrode substrate at and above the above-described lower limit can increase the strength of the negative electrode substrate. The average thickness of the negative electrode substrate at and below the above-described upper limit can increase the energy density per volume of the battery.

The negative composite layer contains a negative active material. The negative composite layer contains optional elements such as a conductive agent, a binder (binding agent), a thickener, and a filler, if necessary. Optional elements such as the conductive agent, the binder, the thickener, and the filler can be selected from the materials exemplified for the positive electrode.

The negative composite layer may contain a typical nonmetal element such as B, N, P, F, Cl, Br, and I, a typical metal element such as Li, Na, Mg, Al, K, Ca, Zn, Ga, and Ge, and a transition metal element such as Sc, Ti, V, Cr, Mn, Fe, Co, Ni, Cu, Mo, Zr, Ta, Hf, Nb, and W as components other than the negative active material, the conductive agent, the binder, the thickener, and the filler.

As such a negative material, known negative active materials can be selected as appropriate. As the negative active material for a lithium secondary battery, a material capable of occluding and releasing lithium ions is typically used. Examples of the negative active material include: metal Li; metals or semimetals such as Si, Sn, and Sb; metal oxides or semimetal oxides such as Si oxides, Ti oxides, and Sn oxides; polyphosphate compounds; silicon carbides; and carbon materials such as graphite and non-graphite carbons (graphitizable carbon or non-graphitizable carbon).

Among these materials, a material having a low working potential is preferable. In particular, it is preferable to use metal Li. Further, in the present embodiment, when a material containing no Li such as graphite is used as the negative active material, a step of inserting lithium ions into either the positive electrode or the negative electrode is required. By contrast, when metal Li is used as the negative active material, the step of inserting lithium ions can be omitted, which makes the use of metal Li preferable. In the negative composite layer, one of these materials may be used alone, or two or more of these materials may be mixed and used.

"Graphite" refers to a carbon material having an average lattice spacing ($d_{002}$) of 0.33 nm or more and less than 0.34 nm in the (002) plane determined by the X-ray diffraction method before charge-discharge or in a discharged state. Examples of graphite include natural graphite and artificial graphite. Artificial graphite is preferable from the viewpoint of capable of obtaining a material having stable physical properties.

"Non-graphite carbons" refer to carbon materials having an average lattice spacing ($d_{002}$) of 0.34 nm or more and 0.42 nm or less in the (002) plane determined by X-ray diffraction method before charge-discharge or in a discharged state. The crystallite size Lc of non-graphite carbons is typically 0.80 to 2.0 nm. Examples of the non-graphite carbons include non-graphitizable carbon and graphitizable carbon. Examples of the non-graphite carbons include a resin-derived material, a petroleum pitch-derived material, an alcohol-derived material, and the like.

Here, the "discharged state" refers to a state in which the open circuit voltage is 0.7 V or more in a single-pole battery using a negative electrode containing a carbon material, as a negative active material, as a working electrode and metal Li as a counter electrode. Since the potential of the metal Li counter electrode in the open circuit state is approximately equal to the oxidation-reduction potential of Li, the open circuit voltage in the above-described single-pole battery is approximately equal to the potential of the negative electrode containing the carbon material with respect to the oxidation-reduction potential of Li. That is, the fact that the open circuit voltage of the above-described single-pole battery is 0.7 V or more means that lithium ions that can be occluded and released along with charge-discharge are sufficiently released from the carbon material, which is the negative active material.

The "non-graphitizable carbon" refers to a carbon material having $d_{002}$ described above of 0.36 nm or more and 0.42 nm or less. The non-graphitizable carbon typically has a property of being difficult to form a graphite structure with three-dimensional stacking regularity among the non-graphite carbons.

The "graphitizable carbon" refers to a carbon material having $d_{002}$ described above of 0.34 nm or more and less than 0.36 nm. The graphitizable carbon typically has a property of easily forming a graphite structure with three-dimensional stacking regularity among the non-graphite carbons.

The lower limit of the content of the negative active material in the negative composite layer is preferably 60% by mass, more preferably 80% by mass, and further preferably 90% by mass. By setting the content of the negative active material to the above lower limit or more, the electric capacity of the battery can be increased. The upper limit of the content of the negative active material is preferably 99% by mass, more preferably 98% by mass. By setting the content of negative active material particles to the above upper limit or less, the production of the negative electrode becomes easy.

(Separator)

A separator can be selected as appropriate from known separators. As the separator, for example, a separator composed of only a substrate layer, a separator in which a heat-resistant layer containing heat-resistant particles and a binder is formed on one surface or both surfaces of a substrate layer, and the like can be used. Examples of the material of the substrate layer of the separator include woven fabrics, non-woven fabrics, porous resin films, and the like. Among these materials, porous resin films are preferable from the viewpoint of strength, and non-woven fabrics are preferable from the viewpoint of liquid retention of a nonaqueous electrolyte. As the material of the substrate layer of the separator, polyolefins such as polyethylene and polypropylene, for example, are preferable from the viewpoint of shutdown function, and polyimide, aramid, and the like are preferable from the viewpoint of oxidative decomposition resistance. A composite material of these resins may be used as the substrate layer of the separator.

Heat-resistant particles contained in the heat-resistant layer preferably have a weight loss of 5% or less at 500° C.

in the atmosphere, and more preferably have a weight loss of 5% or less at 800° C. in the atmosphere. Examples of the materials having a weight loss of a predetermined value or less include inorganic compounds. Examples of the inorganic compounds include: oxides such as iron oxide, silicon oxide, aluminum oxide, titanium oxide, barium titanate, zirconium oxide, and aluminum oxide-silicon oxide composite oxide; nitrides such as aluminum nitride and silicon nitride; poorly soluble ionic crystals such as calcium fluoride, barium fluoride, and barium sulfate; covalent crystals such as silicon and diamond; mineral resource-derived substances such as talc, montmorillonite, boehmite, zeolite, apatite, kaolin, mullite, spinel, olivine, sericite, bentonite, and mica, or artificial products of these. As the inorganic compounds, a simple substance or a composite of these substances may be used alone, or two or more kinds thereof may be mixed and used. Among these inorganic compounds, silicon oxide, aluminum oxide, or aluminum oxide-silicon oxide composite oxide is preferable.

The porosity of the separator is preferably 80% by volume or less from the viewpoint of strength, and preferably 20% by volume or more from the viewpoint of discharge performance. Here, the "porosity" is a volume-based value, and means a value measured with a mercury porosimeter.

As the separator, a polymer gel composed of a polymer and a nonaqueous electrolyte may be used. Examples of the polymer include polyacrylonitrile, polyethylene oxide, polypropylene oxide, polymethylmethacrylate, polyvinylacetate, polyvinylpyrrolidone, polyvinylidene fluoride, and the like. The use of the polymer gel has the effect of suppressing leakage from the battery. As the separator, a polymer gel may be used in combination with a porous resin film, a non-woven fabric, or the like as described above.

(Nonaqueous Electrolyte Solution)

The nonaqueous electrolyte solution contains a nonaqueous solvent containing a fluorinated solvent and an electrolyte salt dissolved in the nonaqueous solvent. The nonaqueous electrolyte solution contains a chain fluorinated carboxylic acid ester, a chain fluorinated carbonate, or a combination thereof as a fluorinated solvent.

The nonaqueous electrolyte solution contains, for example, a chain fluorinated carboxylic acid ester represented by Formula (1).

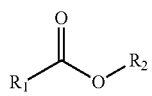

Formula (1)

In Formula (1), $R_1$ is a hydrogen or monovalent organic group and $R_2$ is a monovalent organic group. Examples of the organic groups represented by $R_1$ and $R_2$ include: a hydrocarbon group such as an alkyl group, a cycloalkyl group, an alkenyl group, and an aryl group having 1 to 10 carbon atoms; a hydrocarbon group in which a part or all of the hydrogen atoms in the above-described groups is substituted with a halogen atom (chlorine, fluorine, bromine, iodine atom, and the like) or with a functional group such as an oxyalkylene group, a sulfo group, a thiol group, an aldehyde group, a cyano group, and an amide group; a group in which —O—, —NH—, —N(CH$_3$)—, —SO$_2$—, —CO—, —COO—, or the like is included in the above-described hydrocarbon groups; and the like.

At least one of $R_1$ and $R_2$ is a fluorinated hydrocarbon group in which at least one hydrogen atom is substituted with a fluorine atom. Among $R_1$ and $R_2$, only $R_1$ may be a fluorinated hydrocarbon group, only $R_2$ may be a fluorinated hydrocarbon group, or both may be fluorinated hydrocarbon groups.

Examples of the chain fluorinated carboxylic acid ester include methyl 2,2-difluoroacetate, methyl 2,2,2-trifluoroacetate, ethyl 2,2,2-trifluoroacetate, methyl 3,3,3-trifluoropropionate, ethyl 3,3,3-trifluoropropionate, trifluoromethyl acetate, 2,2-difluoroethyl acetate, 2,2,2-trifluoroethyl acetate, trifluoromethyl propionate, 2,2,2-trifluoroethyl propionate, 3,3,3-trifluoro propionate 2,2,2-trifluoroethyl, and the like.

The nonaqueous electrolyte solution contains, for example, a chain fluorinated carbonate represented by Formula (2).

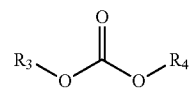

Formula (2)

In Formula (2), $R_3$ and $R_4$ are independently monovalent organic groups. Examples of the organic groups represented by $R_3$ and $R_4$ include the same organic groups as those exemplified for $R_1$ and $R_2$.

At least one of $R_3$ and $R_4$ is a fluorinated hydrocarbon group in which at least one hydrogen atom is substituted with a fluorine atom. Among $R_3$ and $R_4$, only $R_3$ may be a fluorinated hydrocarbon group, only $R_4$ may be a fluorinated hydrocarbon group, or both may be fluorinated hydrocarbon groups.

Examples of the chain fluorinated carbonate include 2,2-difluoroethyl methyl carbonate, ethyl-(2,2-difluoroethyl) carbonate, bis (2,2-difluoroethyl)carbonate, 2,2,2-trifluoroethyl methyl carbonate, ethyl-(2,2,2-trifluoroethyl)carbonate, bis(2,2,2-trifluoroethyl)carbonate, and the like.

In the fluorinated hydrocarbon groups of Formulae (1) and (2), the number of fluorine atoms substituted is not particularly limited, and may be one or more. When the number of fluorine atoms substituted is small, it is considered that the oxidation resistance is low and the reduction resistance is high, whereby a surface film is easily formed on the positive electrode and reduction decomposition is difficult on the negative electrode. From such a point of view, the number of fluorine atoms substituted is preferably 6 or less, more preferably 5 or less, further preferably 4 or less, and still further preferably 3 or less. The carbon to which the fluorine atoms are bonded is not particularly limited, and may be a carbon located at the terminal of the hydrocarbon groups or a carbon other than the one at the terminal.

In Formulae (1) and (2), the hydrocarbon groups of $R_1$, $R_2$, $R_3$, and $R_4$ preferably have 1 to 8 carbon atoms, more preferably 1 to 5 carbon atoms, and further preferably 1 to 3 carbon atoms. By setting the number of carbon atoms to these values, the viscosity of the chain fluorinated carboxylic acid ester or the chain fluorinated carbonate can be lowered.

When $R_1$, $R_2$, $R_3$, and $R_4$ are organic groups that are not fluorinated hydrocarbon groups, these organic groups are preferably alkyl groups or alkenyl groups, and more preferably alkyl groups. These organic groups may be linear or branched.

Examples of the alkyl group include CH$_3$—, CH$_3$CH$_2$—, CH$_3$CH$_2$CH$_2$—, and the like. Examples of the alkenyl group include CH$_2$═CH—, CH$_2$═CHCH$_2$—, CH$_2$═C(CH$_3$)—, and the like.

The lower limit of the total content rate of the chain fluorinated carboxylic acid ester and the chain fluorinated carbonate in the nonaqueous electrolyte solution is preferably 20% by volume or more, more preferably 30% by volume or more, further preferably 40% by volume or more, and still further preferably 50% by volume or more. The upper limit may be 100% by volume or less, 90% by volume or less, 80% by volume or less, or 70% by volume or less. As a result, the effect of the present invention for increasing the capacity retention rate after charge-discharge is repeated can be more reliably exhibited.

The reason for this is not clear, but the following can be presumed, for example.

It is considered that the chain fluorinated carboxylic acid ester and the chain fluorinated carbonate contained in the nonaqueous electrolyte solution are oxidized and decomposed at the positive electrode to form a surface film on the surface of the sulfur-based positive active material. It is considered that this surface film reduces the area of direct contact between the sulfur-based active material and the nonaqueous electrolyte solution and suppresses the elution of lithium polysulfide into the nonaqueous electrolyte solution. However, since the volume of the sulfur-based active material changes greatly with charge-discharge, the surface film may be cracked due to repeated charge-discharge, and lithium polysulfide may elute into the nonaqueous electrolyte solution.

Here, when the total content of the chain fluorinated carboxylic acid ester and the chain fluorinated carbonate in the nonaqueous electrolyte solution is 20% by volume or more, even if the surface film is cracked, a new surface film is likely to be formed. As a result, it is considered that the elution of lithium polysulfide can be reliably suppressed, whereby the capacity retention rate after charge-discharge is repeated can be increased.

The lower limit of the content rate of the chain fluorinated ether in the fluorinated solvent is 0% by volume, preferably more than 0% by volume, further preferably 5% by volume, and still further preferably 7% by volume. The upper limit of the content rate of the chain fluorinated ether in the fluorinated solvent is 20% by volume or less, preferably 18% by volume or less, further preferably 15% by volume or less, and still further preferably 10% by volume.

By setting the content rate of the chain fluorinated ether in the fluorinated solvent to the above value, it is possible to achieve both increased capacity retention rate after charge-discharge is repeated and increased discharge capacity at the initial stage of the charge-discharge cycle.

The reason for this is not clear, but the following can be presumed, for example.

The chain fluorinated ether has higher oxidation resistance and lower reduction resistance than the chain fluorinated carbonate and the chain fluorinated carboxylic acid ester. Thus, it is considered that when the nonaqueous electrolyte solution contains the chain fluorinated ether to have the above content rate, the reactivity of the fluorinated solvent at the positive electrode is moderately lowered without significantly impairing the reduction resistance of the nonaqueous electrolyte solution, whereby the oxidative decomposition of the fluorinated solvent can be suppressed. With this mechanism, it is possible to increase the discharge capacity at the initial stage of the charge-discharge cycle while increasing the capacity retention rate after charge-discharge is repeated.

The chain fluorinated ether in the fluorinated solvent may contain, for example, a chain fluorinated ether represented by Formula (3).

$$R_5—O—R_6 \qquad \text{Formula (3)}$$

In Formula (3), $R_5$ and $R_6$ are independently monovalent organic groups. Examples of the organic groups represented by $R_5$ and $R_6$ include the same organic groups as those exemplified for $R_1$ and $R_2$.

At least one of $R_5$ and $R_6$ is a fluorinated hydrocarbon group in which at least one hydrogen atom is substituted with a fluorine atom. Among $R_5$ and $R_6$, only $R_5$ may be a fluorinated hydrocarbon group, only $R_6$ may be a fluorinated hydrocarbon group, or both may be fluorinated hydrocarbon groups.

Examples of the chain fluorinated ether include CF3CF2CH2OCH3, HCF2CF2OCH2CF2CF2H, HCF2CF2CH2OCF2CHFCF3, CF3CF2CH2OCF2CHFCF3, CF3CF2CH2OCF2CF2H, HCF2CF2OC2H5, HCF2CF2OC3H7, HCF2CF2OC4H9, CF3CHFCF2OC2H5, CF3CH2OCH2CH2OCH3, and the like.

In the fluorinated hydrocarbon group of Formula (3), the number of fluorine atoms substituted may be one or more. The upper limit is not particularly limited, but may be 11 or less, for example. The carbon to which the fluorine atoms are bonded is not particularly limited, and may be a carbon located at the terminal of the hydrocarbon groups or a carbon other than the one at the terminal.

In Formula (3), the hydrocarbon groups of $R_5$ and $R_6$ preferably have 1 to 8 carbon atoms, more preferably 1 to 5 carbon atoms, and further preferably 1 to 4 carbon atoms. By setting the number of carbon atoms to these values, the viscosity of the chain fluorinated ether can be lowered.

When $R_5$ and $R_6$ are organic groups that are not fluorinated hydrocarbon groups, these organic groups are preferably alkyl groups or alkenyl groups, and more preferably alkyl groups. These organic groups may be linear or branched.

The nonaqueous electrolyte solution preferably contains a chain solvent and a cyclic solvent. The mixing ratio of the chain solvent and the cyclic solvent in the nonaqueous electrolyte solution is preferably in the range of 30:70 to 70:30 in terms of volume ratio. As a result, it is possible to achieve both lowered viscosity of the nonaqueous electrolyte solution and increased ionic conductivity of the nonaqueous electrolyte solution.

The lower limit of the content of the fluorinated solvent contained in the nonaqueous electrolyte solution may be 60% by volume, and is preferably 63% by volume, further preferably 65% by volume, still further preferably 68% by volume, and even further preferably 70% by volume based on the total volume of the nonaqueous electrolyte solution. The upper limit of the content of the fluorinated solvent contained in the nonaqueous electrolyte solution is 100% by volume, and may be 99% by volume, 98% by volume, 97% by volume, or 95% by volume based on the total volume of the nonaqueous electrolyte solution. With these rates, the capacity retention rate after charge-discharge is repeated can be increased.

The fluorinated solvent preferably contains a chain fluorinated solvent and a cyclic fluorinated solvent. The mixing ratio of the chain fluorinated solvent and the cyclic fluorinated solvent in the fluorinated solvent is preferably in the range of 30:70 to 70:30 in terms of volume ratio. As a result, it is possible to achieve both lowered viscosity of the nonaqueous electrolyte solution and increased ionic conductivity of the nonaqueous electrolyte solution.

The content rate of the cyclic fluorinated solvent in the cyclic solvent contained in the nonaqueous electrolyte solution is preferably 50% by volume or more and 100% by volume or less. With this rate, the capacity retention rate after charge-discharge is repeated can be increased.

The fluorinated solvent preferably contains a cyclic fluorinated carbonate. As a result, the dissociation of the electrolyte salt can be promoted and the ionic conductivity of the nonaqueous electrolyte solution can be increased.

Examples of the cyclic fluorinated carbonate include fluoroethylene carbonate (FEC), 4,4-difluoroethylene carbonate, 4,5-difluoroethylene carbonate, trifluoropropylene carbonate (4-(trifluoromethyl)-ethylene carbonate), and 4-fluoro-4-methylethylene carbonate, 4-fluoro-5-methylethylene carbonate, 4-(fluoromethyl)-ethylene carbonate, and the like. Among these, fluoroethylene carbonate, 4,4-difluoroethylene carbonate, and 4,5-difluoroethylene carbonate are preferable, and fluoroethylene carbonate is more preferable.

The nonaqueous electrolyte solution preferably contains a non-fluorinated solvent. The nonaqueous electrolyte solution contains a non-fluorinated solvent, which can further increase the capacity retention rate after charge-discharge is repeated. The reason for this is not clear, but for example, the fact that the non-fluorinated solvent easily reacts with lithium polysulfide and easily forms a surface film on the surface of the sulfur-based active material is presumed as the reason for increasing the retention rate of the discharge capacity after charge-discharge is repeated.

The non-fluorinated solvent is not particularly limited, but preferable contains a compound containing a C=O double bond in the molecular structure. Examples of such a non-fluorinated solvent include carbonates, esters, aldehydes, ketones, and the like. By using such a non-fluorinated solvent, it is possible to increase the retention rate of the discharge capacity after charge-discharge is repeated.

The content rate of the compound containing a C=O double bond in the molecular structure in the non-fluorinated solvent is preferably 50% by volume or more and 100% by volume or less, more preferably 60% by volume or more and 100% by volume or less, further preferably 70% by volume or more and 100% by volume or less, and still further preferably 80% by volume or more and 100% by volume or less. With these rates, the retention rate of the discharge capacity after charge-discharge is repeated can be more reliably increased.

The carbonate that can be used as the non-fluorinated solvent may be a cyclic carbonate or a chain carbonate. Examples of the cyclic carbonate include ethylene carbonate (EC), propylene carbonate (PC), butylene carbonate (BC), vinylene carbonate (VC), vinylethylene carbonate (VEC), chloroethylene carbonate, catechol carbonate, 1-phenylvinylene carbonate, 1,2-diphenylvinylene carbonate, styrene carbonate, 1-phenylvinylene carbonate, 1,2-diphenylvinylene carbonate, and the like. Among these, ethylene carbonate and propylene carbonate are preferable, and ethylene carbonate, which is hard to be oxidized and reduced, is more preferable. Examples of the chain carbonate include dimethyl carbonate, diethyl carbonate, di-n-propyl carbonate, diisopropyl carbonate, n-propylisopropyl carbonate, ethylmethyl carbonate, methyl-n-propyl carbonate, n-butylmethyl carbonate, isobutylmethyl carbonate, t-butylmethyl carbonate, ethyl-n-propyl carbonate, n-butylethyl carbonate, n-isobutylethyl carbonate, t-butylethyl carbonate, and the like. Among these, dimethyl carbonate, diethyl carbonate, di-n-propyl carbonate, diisopropyl carbonate, n-propylisopropyl carbonate, ethylmethyl carbonate, and methyl-n-propyl carbonate are preferable, and dimethyl carbonate, diethyl carbonate, and ethylmethyl carbonate are particularly preferable.

Examples of the ester that can be used as the non-fluorinated solvent include: cyclic carboxylic acid esters such as γ-butyrolactone and γ-valerolactone; chain carboxylic acid esters such as methyl acetate, ethyl acetate, propyl acetate, methyl propionate (MP), and ethyl propionate; and the like.

The lower limit of the content of the non-fluorinated solvent contained in the nonaqueous electrolyte solution may be 1% by volume, preferably 2% by volume, more preferably 3% by volume, and further preferably 5% by volume based on the total volume of the nonaqueous electrolyte solution. The upper limit of the content of the non-fluorinated solvent contained in the nonaqueous electrolyte solution may be 40% by volume, preferably 35% by volume, more preferably 32% by volume, and further preferably 30% by volume based on the total volume of the nonaqueous electrolyte solution. With these rates, the capacity retention rate after charge-discharge is repeated can be increased.

The nonaqueous electrolyte solution may contain a known nonaqueous solvent in addition to those described above. Examples of the nonaqueous solvent include carboxylic acid esters, phosphoric acid esters, sulfonic acid esters, ethers, amides, nitriles, and the like. As the nonaqueous solvent, those in which some of the hydrogen atoms contained in these compounds are substituted with halogen may be used.

The electrolyte salt can be selected as appropriate from known electrolyte salts. Examples of the electrolyte salts include lithium salts, sodium salts, potassium salts, magnesium salts, onium salts, and the like. Among these, lithium salts are preferred.

Examples of the lithium salts include: inorganic lithium salts such as $LiPF_6$, $LiPO_2F_2$, $LiBF_4$, $LiClO_4$, $LiN(SO_2F)_2$, $LiAsF_6$, and lithium difluorooxalate borate (LiFOB); lithium salts having a halogenated hydrocarbon group such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$; and the like. At least one selected from these may be used, or two or more of these may be used in combination. Among these, $LiPF_6$, $LiBF_4$, $LiN(SO_2F)_2$, and $LiN(SO_2CF_3)_2$ are preferable from the viewpoint of electrical conductivity, and $LiN(SO_2F)_2$ and $LiN(SO_2CF_3)_2$ are more preferable from the viewpoint of cation dissociation degree.

As the lower limit of the content of the electrolyte salt in the nonaqueous electrolyte solution, 0.1 M is preferable, 0.3 M is more preferable, 0.5 M is further preferable, and 0.7 M is particularly preferable. As the upper limit of the content of the electrolyte salt, for example, 2.5M is preferable, 2M is more preferable, and 1.5M is further preferable.

The nonaqueous electrolyte solution may contain additives. In the present specification, the additives mean substances the content of which in the nonaqueous electrolyte solution is smaller than 20% by mass. Examples of the additives include: salts having an oxalate group such as lithium bis(oxalate) borate (LiBOB) and lithium bis(oxalate) difluorophosphate (LiFOP); aromatic compounds such as biphenyl, alkylbiphenyl, terphenyl, partially hydrogenated terphenyl, cyclohexylbenzene, t-butylbenzene, t-amylbenzene, diphenyl ether, and dibenzofuran; partially halogenated aromatic compounds described above such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; methylvinylene carbonate, ethylvinylene carbonate, succinic anhydride, glutaric anhydride, maleic anhydride, citraconic anhydride, glutaconic anhydride, itaconic anhydride, and cyclohexanedicarboxylic anhydride; ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethylsulfone, diethylsulfone, dimethylsulfoxide, diethylsulfoxide, tetramethylenesulfoxide, diphenylsulfide, 4,4'-bis(2,2-dioxo-1,3,2-dioxathiolane), 4-methylsulfonyloxymethyl-2,2-dioxo-1,3,2-dioxathiolane, thioanisole, diphenyldisulfide, dipyridinium disulfide, perfluorooctane, tristrimethylsilyl borate, tristrimethylsilyl phosphate, tetrakistrimethylsilyl titanate, lithium monofluorophosphate, and the like. One of these additives may be used alone, or two or more of these may be mixed and used.

The lower limit of the content rate of these additives with respect to the entire nonaqueous electrolyte solution is preferably 0.01% by mass, more preferably 0.1% by mass, and further preferably 0.2% by mass. As the upper limit of the content rate of the additives, 10% by mass is preferable, 7% by mass is more preferable, 5% by mass is further preferable, and 3% by mass is still further preferable. By setting the content rate of the additives in the above ranges, it is possible to improve the capacity retention performance or charge-discharge cycle performance after high-temperature storage, and to improve safety.

The nonaqueous electrolyte solution secondary battery may include a solid electrolyte.

The solid electrolyte can be selected from any material that has ionic conductivity and is solid at room temperature (for example, 15° C. to 25° C.), such as lithium, sodium, and calcium. Examples of the solid electrolyte include sulfide solid electrolytes, oxide solid electrolytes, oxynitride solid electrolytes, polymer solid electrolytes, and the like.

In the case of a lithium secondary battery, examples of the sulfide solid electrolytes include $Li_2S$—$P_2S_5$-series. Examples of the sulfide solid electrolytes include $Li_2S$—$P_2S_5$, $LiI$—$Li_2S$—$P_2S_5$, $Li_{10}Ge$—$P_2S_{12}$, and the like.

The shape of the nonaqueous electrolyte solution secondary battery is not particularly limited, and examples thereof include a cylindrical battery, a pouch battery, a prismatic battery, a flat battery, a coin battery, and a button battery.

FIG. 1 illustrates an example of a prismatic battery. An electrode assembly 2 having a positive electrode and a negative electrode wound with a separator interposed therebetween is housed in a prismatic case 3. The positive electrode is electrically connected to a positive electrode terminal 4 via a positive electrode lead 41. The negative electrode is electrically connected to a negative electrode terminal 5 via a negative electrode lead 51.

<Configuration of Energy Storage Apparatus>

A plurality of nonaqueous electrolyte solution secondary batteries 1 as described above are assembled to form an energy storage unit (battery module). Such energy storage units are further assembled to serve as an energy storage apparatus mounted in power sources for automobiles such as electric vehicles (EV), hybrid vehicles (HEV), and plug-in hybrid vehicles (PHEV), power sources for electronic devices such as personal computers and communication terminals, power sources for power storage, and the like. In this case, the technique of the present invention may be applied to at least one nonaqueous electrolyte solution secondary battery included in the energy storage apparatus.

Figure 2:
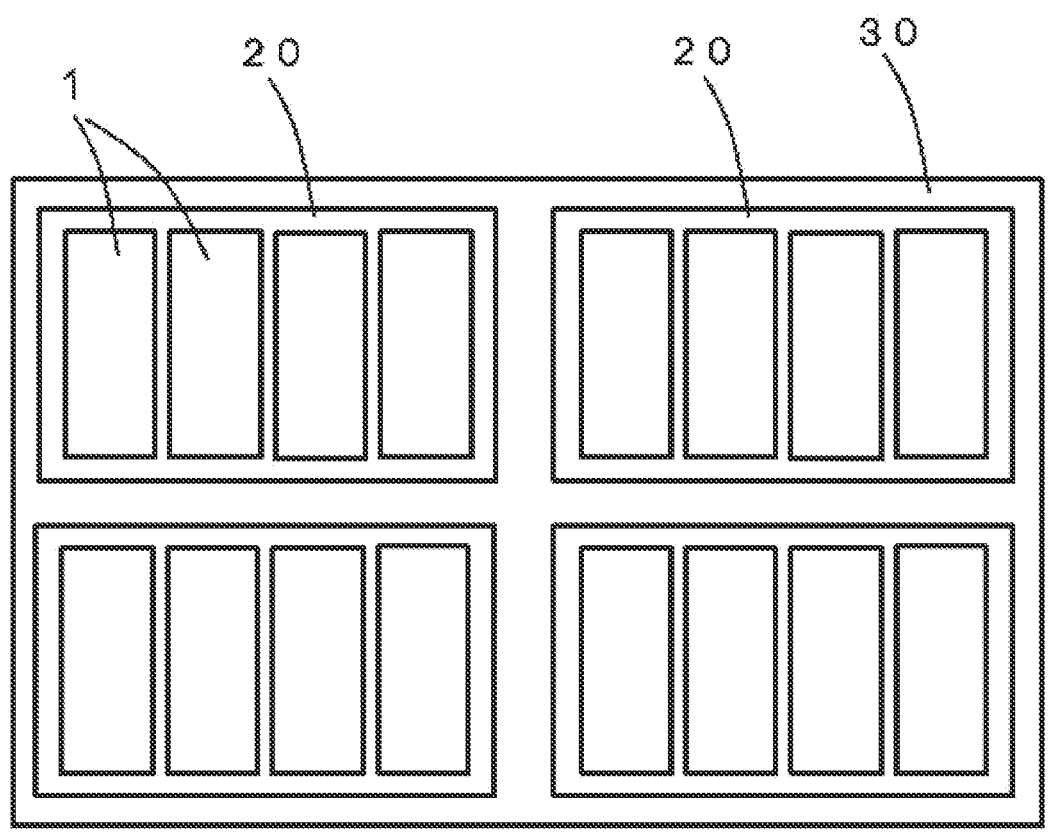
FIG. 2 is a schematic view illustrating an embodiment of an energy storage apparatus in which a plurality of nonaqueous electrolyte solution secondary batteries are assembled.

FIG. 2 illustrates an example of an energy storage apparatus 30 in which energy storage units 20 in which two or more electrically connected nonaqueous electrolyte solution secondary batteries 1 are assembled are further assembled. The energy storage apparatus 30 includes a bus bar (not illustrated) that electrically connects two or more nonaqueous electrolyte solution secondary batteries 1 and a bus bar (not illustrated) that electrically connects two or more energy storage units 20. The energy storage units 20 or the energy storage apparatus 30 may include a state monitoring apparatus (not illustrated) for monitoring the state of the one or more nonaqueous electrolyte solution secondary batteries.

<Method for Manufacturing Nonaqueous Electrolyte Solution Secondary Battery>

A method for manufacturing the nonaqueous electrolyte solution secondary battery energy storage device can be selected as appropriate from known methods. This manufacturing method includes, for example, a step of preparing an electrode assembly, a step of preparing a nonaqueous electrolyte solution, and a step of accommodating the electrode assembly and the nonaqueous electrolyte solution in a case. The step of preparing the electrode assembly includes a step of preparing a positive electrode and a negative electrode, and a step of forming an electrode assembly by laminating or winding the positive electrode and the negative electrode with a separator interposed therebetween.

The step of accommodating the nonaqueous electrolyte solution in the case can be selected as appropriate from known methods. For example, the nonaqueous electrolyte solution may be injected from an injection port formed in the case, and then the injection port may be sealed.

Other Embodiments

The nonaqueous electrolyte solution secondary battery according to the present invention is not limited to the above embodiment, and various changes may be made without departing from the gist of the present invention. For example, the configuration of one embodiment can be added to the configuration of another embodiment, and a part of the configuration of one embodiment can be replaced with the configuration of another embodiment or a well-known technique. In addition, part of the configuration of an embodiments can be deleted. Further, a well-known technique can be added to the configuration of an embodiment.

In the above embodiment, the case where the nonaqueous electrolyte solution secondary battery is used as the lithium secondary battery has been described, but the type, shape, size, capacity, and the like of the nonaqueous electrolyte solution secondary battery are optional. The present invention can also be applied to various nonaqueous electrolyte solution secondary batteries other than lithium secondary batteries.

EXAMPLES

Hereinafter, the present invention will be described in more detail with reference to examples. Note that the present invention is not limited to the following examples.

Example 1

(Making of Sulfur-Mesoporous Carbon Composite)

Sulfur and mesoporous carbon (CNovel) (manufactured by Toyo Tanso Co., Ltd.) were mixed at a mass ratio of 77:23. The physical properties of mesoporous carbon were an average pore diameter of 5 nm, a microporous volume of 0.34 $ccg^{-1}$, a mesoporous volume of 1.02 $ccg^{-1}$, a total pore volume of 1.7 $ccg^{-1}$, and a specific surface area of 1500 $m^2g^{-1}$. The mixture was placed in a sealed electric furnace. After one hour of argon flow, the mixture was heat-treated in which it was heated to 150° C. at a temperature increase rate of 5° C./min, held for five hours, allowed to cool to 80°

C., at which sulfur solidifies, then heated again to 300° C. at 5° C./min, and held for two hours. Through the above procedure, the sulfur-mesoporous carbon composite of Example 1 was obtained.

(Making of Nonaqueous Electrolyte Solution Secondary Battery)

The sulfur-mesoporous carbon composite, acetylene black as a conductive aid, and CMC/SBR as a binder were mixed at a mass ratio of 80:10:10 to prepare slurry containing water as a dispersion medium. CMC and SBR were mixed at a mass ratio of 1.2:2.1. The slurry thus prepared was applied to a current collector and dried to make an electrode. A battery was made including the electrode thus made serving as a positive electrode, metal Li as a negative electrode, and a nonaqueous electrolyte solution in which 1 M of lithium bis(trifluoromethanesulfonyl)imide (LiTFSI) was dissolved in a mixed solvent of 2,2,2-trifluoroethyl acetate (TFEA) and fluoroethylene carbonate (FEC). The mixing ratio of TFEA and FEC was 50:50 by volume. The battery was covered with an aluminum laminated film to form a pouch cell.

Example 2

A battery similar to that of Example 1 was made except that a mixed solvent of 2,2,2-trifluoroethylmethyl carbonate (TFEMC) and FEC was used as the solvent.

Example 3

A battery similar to that of Example 1 was made except that a mixed solvent of bis(2,2,2-trifluoroethyl) carbonate (FDEC) and FEC was used as the solvent.

Example 4

A battery similar to that of Example 1 was made except that a mixed solvent of methyl 3,3,3-trifluoropropionate (FMP) and FEC was used as the solvent.

Comparative Example 1

A battery similar to that of Example 1 was made except that a mixed solvent of 1,1,2,2-tetrafluoroethyl-2,2,3,3-tetrafluoropropyl ether (TFETFPE) and FEC was used as the solvent.

Example 5

A battery similar to that of Example 1 was made except that a mixed solvent in which TFEA and FEC were mixed at a volume ratio of 70:30 was used as the solvent.

Example 6

A battery similar to that of Example 1 was made except that a mixed solvent in which TFEMC and FEC were mixed at a volume ratio of 70:30 was used as the solvent.

Example 71

A battery similar to that of Example 1 was made except that a mixed solvent in which FDEC and FEC were mixed at a volume ratio of 70:30 was used as the solvent.

Example 8

A battery similar to that of Example 1 was made except that a mixed solvent in which FMP and FEC were mixed at a volume ratio of 70:30 was used as the solvent.

Comparative Example 21

A battery similar to that of Example 1 was made except that a mixed solvent in which TFETFPE and FEC were mixed at a volume ratio of 70:30 was used as the solvent.

Examples 9 to 18

Batteries similar to that of Example 1 were made except that mixed solvents having the compositions listed in Table 2 were used as the solvent. Note that EMC in the table refers to ethyl methyl carbonate.

Example 19 and Example 20

Batteries similar to that in Example 1 were made except that mixed solvents having the compositions listed in Table 3 were used as the solvent.

Comparative Example 31

A sulfur-microporous carbon composite was made through a similar procedure to that in Example 1 except that microporous carbon (CNovelMH, manufactured by Toyo Tanso Co., Ltd.) was used instead of the mesoporous carbon of Example 1. The physical properties of microporous carbon were an average pore diameter of 5 nm, a microporous volume of 0.40 ccg$^{-1}$, a mesoporous volume of 0.25 ccg$^{-1}$, and a specific surface area of 1800 m$^2$g$^{-1}$.

A battery similar to that of Example 1 was made except that the sulfur-microporous carbon composite was used instead of the sulfur-mesoporous carbon composite of Example 1, and a mixed solvent in which TFEMC and FEC were mixed at a volume ratio of 50:50 was used as the solvent.

The structures of TFEA, TFEMC, FDEC, FMP, and TFETFPE are illustrated in Formulae (4) to (8), respectively.

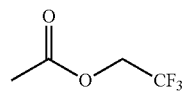

Formula (4)

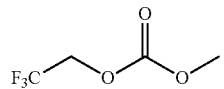

Formula (5)

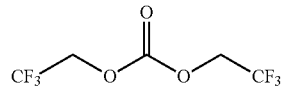

Formula (6)

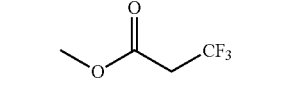

Formula (7)

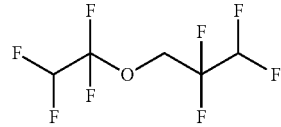

Formula (8)

Test Example 1

(Capacity Retention Rate in 10th Cycle)

A charge-discharge cycle test was conducted on each of the batteries of Examples 1 to 8 and Comparative Examples 1 and 2 under the following conditions.

A constant current discharge of 0.1 C was performed to reach 1 V at 25° C. After the discharge, a constant current charge of 0.2 C was performed to reach 3 V at 25° C. This cycle of discharge and charge steps was repeated 12 times. After the discharge and charge, a 10-minute rest was provided at 25° C. The discharge, charge, and rest were performed in a constant temperature bath at 25° C.

For batteries on which the charge-discharge cycle test was completed, the ratio of the discharge capacity in the 12th cycle to the discharge capacity in the 3rd cycle was defined as the "capacity retention rate in the 10th cycle".

Table 1 below lists the results of Examples 1 to 8 and Comparative Examples 1 and 2.

TABLE 1

| | Nonaqueous electrolyte solution | | | |
|---|---|---|---|---|
| | Solvent 1 | Solvent 2 | Solvent mixing ratio (Solvent 1:Solvent 2)/ % by volume | Capacity retention rate in 10th cycle/% |
| Example 1 | TFEA | FEC | 50:50 | 100 |
| Example 2 | TFEMC | FEC | 50:50 | 100 |
| Example 3 | FDEC | FEC | 50:50 | 99 |
| Example 4 | FMP | FEC | 50:50 | 100 |
| Comparative Example 1 | TFETFPE | FEC | 50:50 | 75 |
| Example 5 | TFEA | FEC | 70:30 | 100 |
| Example 6 | TFEMC | FEC | 70:30 | 100 |
| Example 7 | FDEC | FEC | 70:30 | 95 |
| Example 8 | FMP | FEC | 70:30 | 100 |
| Comparative Example 2 | TFETFPE | FEC | 70:30 | 22 |

It can be seen from Table 1 that the batteries of Examples 1, 4, 5, and 8 containing TFEA or FMP, which is a chain fluorinated carboxylic acid ester, have a higher capacity retention rate than the batteries of Comparative Examples 1 and 2 containing no chain fluorinated carboxylic acid ester.

It can also be seen that the batteries of Examples 2, 3, 6, and 7 containing TFEMC or FDEC, which is a chain fluorinated carbonate, have a high capacity retention rate similarly to the batteries of Examples 1, 4, 5, and 8 containing the chain fluorinated carboxylic acid ester.

The examples using TFEA, TFEMC, or FMP exhibited a higher capacity retention rate than in Examples 3 and 7 using FDEC. It is considered that since TFEA, TFEMC, or FMP has a smaller number of bonded fluorine atoms than in FDEC, they have higher reduction resistance and exhibit a higher capacity retention rate.

It can be seen from comparison between Examples 1 to 4 and Examples 5 to 8 that a high capacity retention rate is achieved by changing the content of a chain fluorinated carboxylic acid ester or a chain fluorinated carbonate in the nonaqueous electrolyte solution.

Comparative Examples 1 and 2, containing no chain fluorinated carbonate or chain fluorinated carboxylic acid ester in the nonaqueous electrolyte solution and containing 50% by volume or more of TFETFPE, which is a chain fluorinated ether, exhibited a low capacity retention rate. It is considered that this is because the reduction resistance of the chain fluorinated ether is lower than that of the chain fluorinated carbonate and the chain fluorinated carboxylic acid ester, and reduction decomposition takes place at the negative electrode.

It can be said from the above results that a nonaqueous electrolyte solution secondary battery including a positive electrode containing a sulfur-mesoporous carbon composite can have a high capacity retention rate by including a nonaqueous electrolyte solution containing a chain fluorinated carbonate, a chain fluorinated carboxylic acid ester, or a combination thereof.

Test Example 2

(Capacity Retention Rate in 100th Cycle)

A similar test to the charge-discharge cycle test described above was performed on each of the batteries of Examples 9 to 18 except that the number of charge-discharge cycles was changed from 12 cycles to 102 cycles.

For batteries on which the charge-discharge cycle test was completed, the ratio of the discharge capacity in the 102nd cycle to the discharge capacity in the 3rd cycle was defined as the "capacity retention rate in the 100th cycle". Table 2 lists the results of Examples 9 to 18.

TABLE 2

| | Nonaqueous electrolyte solution | | | | |
|---|---|---|---|---|---|
| | Solvent 1 | Solvent 2 | Solvent 3 | Solvent mixing ratio (Solvent 1:Solvent 2:Solvent: 3)/ % by volume | Capacity retention rate in 100th cycle/% |
| Example 9 | TFEA | FEC | — | 50:50:0 | 80 |
| Example 10 | TFEMC | FEC | — | 50:50:0 | 73 |

TABLE 2-continued

| | Nonaqueous electrolyte solution | | | | Capacity retention rate in 100th cycle/% |
|---|---|---|---|---|---|
| | Solvent 1 | Solvent 2 | Solvent 3 | Solvent mixing ratio (Solvent 1:Solvent 2:Solvent: 3)/ % by volume | |
| Example 11 | TFEA | FEC | EMC | 40:50:10 | 100 |
| Example 12 | TFEA | FEC | EMC | 25:50:25 | 100 |
| Example 13 | TFEMC | FEC | EMC | 40:50:10 | 100 |
| Example 14 | TFEMC | FEC | EMC | 25:50:25 | 100 |
| Example 15 | TFEA | FEC | EC | 50:40:10 | 100 |
| Example 16 | TFEA | FEC | EC | 50:25:25 | 100 |
| Example 17 | TFEMC | FEC | EC | 50:40:10 | 100 |
| Example 18 | TFEMC | FEC | EC | 50:25:25 | 100 |

As is clear from Table 2, it is confirmed that Examples 11 to 18, containing a chain fluorinated carbonate or a chain fluorinated carboxylic acid ester and EMC or EC, which is a non-fluorinated solvent, in the nonaqueous electrolyte solution, can provide a nonaqueous electrolyte solution secondary battery having a capacity retention rate in the 100th cycle of 100% and a particularly excellent capacity retention rate after repeated charge-discharge.

Test Example 3

(Cycle Initial Discharge Capacity, Capacity Retention Rate in 10th Cycle)

A charge-discharge test was conducted on each of the batteries of Examples 2, 19, and 20 under the following conditions.

A constant current discharge of 0.1 C was performed to reach 1 V at 25° C. After the discharge, a constant current charge of 0.1 C was performed to reach 3 V at 25° C. This cycle of discharge and charge steps was repeated 12 times. After the discharge and charge, a 10-minute rest was provided at 25° C. The discharge, charge, and rest were performed in a constant temperature bath at 25° C.

For batteries on which the charge-discharge cycle test was completed, the discharge capacity in the 3rd cycle was defined as the "cycle initial discharge capacity". The ratio of the discharge capacity in the 12th cycle to the discharge capacity in the 3rd cycle was defined as the "capacity retention rate in the 10th cycle".

Table 3 illustrates the results of Examples 2, 19, and 20.

As is clear from Table 3, the batteries of Examples 2, 19, and 20 all had excellent capacity retention rates. Among them, it is confirmed that the battery of Example 19 had not only a high capacity retention rate but also a high initial discharge capacity.

Test Example 4

(Capacity Retention Rate in 10th Cycle, Capacity Retention Rate in 50th Cycle)

A charge-discharge cycle test was conducted on each of the batteries of Example 2 and Comparative Example 3 under the following conditions.

A constant current discharge of 0.1 C was performed to reach 1 V at 25° C. After the discharge, a constant current charge of 0.2 C was performed to reach 3 V at 25° C. This cycle of discharge and charge steps was repeated 52 times. After the discharge and charge, a 10-minute rest was provided at 25° C. The discharge, charge, and rest were performed in a constant temperature bath at 25° C.

For batteries on which the charge-discharge cycle test was completed, the ratio of the discharge capacity in the 12th cycle to the discharge capacity in the 3rd cycle was defined as the "capacity retention rate in the 10th cycle". The ratio of the discharge capacity in the 52nd cycle to the discharge capacity in the 3rd cycle was defined as the "capacity retention rate in the 50th cycle".

Table 4 lists the results of Example 2 and Comparative Example 3.

TABLE 3

| | Nonaqueous electrolyte solution | | | | Initial discharge capacity/ mAhg$^{-1}$ | Capacity retention rate in 10th cycle/ % |
|---|---|---|---|---|---|---|
| | Solvent 1 | Solvent 2 | Solvent 3 | Solvent mixing ratio (Solvent 1:Solvent 2:Solvent 3)/ % by volume | | |
| Example 2 | TFEMC | FEC | — | 50:50:0 | 1494 | 100 |
| Example 19 | TFEMC | FEC | TFETFPE | 40:50:10 | 1568 | 100 |
| Example 20 | TFEMC | FEC | TFETFPE | 25:50:25 | 1533 | 82 |

TABLE 4

|  | Positive electrode | Nonaqueous electrolyte solution | | | Capacity retention rate | |
|---|---|---|---|---|---|---|
|  |  | Solvent 1 | Solvent 2 | Solvent mixing ratio (Solvent 1:Solvent 2)/ % by volume | 10th cycle/ % | 50th cycle/ % |
| Example 2 | Sulfur-mesoporous carbon composite | TFEMC | FEC | 50:50 | 100 | 100 |
| Comparative Example 3 | Sulfur-microporous carbon composite | TFEMC | FEC | 50:50 | 94 | 85 |

It can be seen from Table 4 that the capacity retention rate can be increased by combining a positive electrode containing a sulfur-mesoporous carbon composite and a nonaqueous electrolyte solution containing a chain fluorinated carboxylic acid ester. It can also be seen from Table 4 that the capacity retention rate cannot be increased by combining a positive electrode containing a sulfur-microporous carbon composite and a nonaqueous electrolyte solution containing a chain fluorinated carboxylic acid ester.

It can be understood from the aforementioned that the effect of the present invention of increasing the capacity retention rate after charge-discharge is repeated is peculiar to the combination of a positive electrode containing a sulfur-mesoporous carbon composite and a nonaqueous electrolyte solution containing a chain fluorinated carbonate, a chain fluorinated carboxylic acid ester, or a combination thereof.

Although the present invention has been described in detail above, the above embodiment is merely an example, and the invention disclosed herein includes various modifications and changes of the specific examples described above.

DESCRIPTION OF REFERENCE SIGNS

1: Nonaqueous electrolyte solution secondary battery
2: Electrode assembly
3: Case
4: Positive electrode terminal
41: Positive electrode lead
5: Negative electrode terminal
51: Negative electrode lead
20: Energy storage unit
30: Energy storage apparatus

The invention claimed is:

1. A nonaqueous electrolyte solution secondary battery comprising:
   a positive electrode; and
   a nonaqueous electrolyte solution, wherein
   the positive electrode contains a sulfur-mesoporous carbon composite that is a composite of a sulfur-based active material and mesoporous carbon,
   the mesoporous carbon is a porous carbon having a mesoporous volume larger than a microporous volume, the mesoporous volume being a pore volume derived from pores having a diameter of 2 nm or more and 50 nm or less, the microporous volume being a pore volume derived from pores having a diameter of less than 2 nm,
   a BET specific surface area of the mesoporous carbon is 1500 $m^2g^{-1}$ or more and 4000 $m^2g^{-1}$ or less,
   the nonaqueous electrolyte solution contains a fluorinated solvent, and
   the fluorinated solvent contains a chain fluorinated carbonate, a chain fluorinated carboxylic acid ester, or a combination thereof.

2. The nonaqueous electrolyte solution secondary battery according to claim 1, wherein a total content rate of the chain fluorinated carbonate and the chain fluorinated carboxylic acid ester in the nonaqueous electrolyte solution is 20% by volume or more.

3. The nonaqueous electrolyte solution secondary battery according to claim 1, wherein the fluorinated solvent contains a cyclic fluorinated carbonate.

4. The nonaqueous electrolyte solution secondary battery according to claim 1, wherein the nonaqueous electrolyte solution contains a non-fluorinated solvent.

5. The nonaqueous electrolyte solution secondary battery according to claim 4, wherein a content rate of the non-fluorinated solvent in the nonaqueous electrolyte solution is 1% by volume or more and 40% by volume or less.

6. The nonaqueous electrolyte solution secondary battery according to claim 4, wherein the non-fluorinated solvent contains a non-fluorinated organic compound containing a C=O double bond in a molecular structure thereof.

7. The nonaqueous electrolyte solution secondary battery according to claim 1, wherein
   the fluorinated solvent contains a chain fluorinated ether, and
   a content rate of the chain fluorinated ether in the fluorinated solvent is 5% by volume or more and 15% by volume or less.

8. The nonaqueous electrolyte solution secondary battery according to claim 1, wherein a ratio of the mesoporous volume to the microporous volume of the mesoporous carbon is 1.0 or more and 10 or less.

9. A nonaqueous electrolyte solution secondary battery comprising:
   a positive electrode; and
   a nonaqueous electrolyte solution, wherein
   the positive electrode contains a sulfur-mesoporous carbon composite that is a composite of a sulfur-based active material and mesoporous carbon,
   the mesoporous carbon is a porous carbon having a mesoporous volume larger than a microporous volume, the mesoporous volume being a pore volume derived from pores having a diameter of 2 nm or more and 50 nm or less, the microporous volume being a pore volume derived from pores having a diameter of less than 2 nm,
   a BET specific surface area of the mesoporous carbon is 1500 $m^2g^{-1}$ or more and 4000 $m^2g^{-1}$ or less,
   the nonaqueous electrolyte solution contains a fluorinated solvent, the fluorinated solvent contains a chain fluorinated carbonate, a chain fluorinated carboxylic acid ester, or a combination thereof, and a content rate of chain fluorinated ether in the nonaqueous electrolyte solution is 0% by volume.

10. The nonaqueous electrolyte solution secondary battery according to claim 9, wherein a total content rate of the chain fluorinated carbonate and the chain fluorinated carboxylic acid ester in the nonaqueous electrolyte solution is 20% by volume or more.

11. The nonaqueous electrolyte solution secondary battery according to claim 9, wherein the fluorinated solvent contains a cyclic fluorinated carbonate.

12. The nonaqueous electrolyte solution secondary battery according to claim 9, wherein the nonaqueous electrolyte solution contains a non-fluorinated solvent.

13. The nonaqueous electrolyte solution secondary battery according to claim 12, wherein a content rate of the non-fluorinated solvent in the nonaqueous electrolyte solution is 1% by volume or more and 40% by volume or less.

14. The nonaqueous electrolyte solution secondary battery according to claim 12, wherein the non-fluorinated solvent contains a non-fluorinated organic compound containing a C=O double bond in a molecular structure thereof.

15. The nonaqueous electrolyte solution secondary battery according to claim 9, wherein a ratio of the mesoporous volume to the microporous volume of the mesoporous carbon is 1.0 or more and 10 or less.

16. A nonaqueous electrolyte solution secondary battery comprising:

a positive electrode; and a nonaqueous electrolyte solution, wherein the positive electrode contains a sulfur-mesoporous carbon composite that is a composite of a sulfur-based active material and mesoporous carbon, the mesoporous carbon is a porous carbon having a mesoporous volume larger than a microporous volume, the mesoporous volume being a pore volume derived from pores having a diameter of 2 nm or more and 50 nm or less, the microporous volume being a pore volume derived from pores having a diameter of less than 2 nm, a BET specific surface area of the mesoporous carbon is 1500 $m^2g^{-1}$ or more and 4000 $m^2g^{-1}$ or less, the nonaqueous electrolyte solution contains a fluorinated solvent, the fluorinated solvent contains a chain fluorinated a chain fluorinated solvent and a cyclic fluorinated solvent, a mixing ratio of the chain fluorinated solvent and the cyclic fluorinated solvent in the fluorinated solvent is in a range of 30:70 to 70:30 in terms of volume ratio, the chain fluorinated solvent includes at least one of 2,2,2-trifluoroethyl acetate, 2,2,2-trifluoroethylmethyl carbonate, bis(2,2,2-trifluoroethyl) carbonate or methyl 3,3,3-trifluoropropionate, the cyclic fluorinated solvent includes fluoroethylene carbonate, and a content rate of chain fluorinated ether in the fluorinated solvent is 0% by volume or more and 10% by volume or less.

17. The nonaqueous electrolyte solution secondary battery according to claim 16, wherein the nonaqueous electrolyte solution contains a non-fluorinated solvent including at least one of ethyl methyl carbonate or ethylene carbonate.

18. The nonaqueous electrolyte solution secondary battery according to claim 17, wherein a content rate of the non-fluorinated solvent in the nonaqueous electrolyte solution is 10% by volume or more and 25% by volume or less.

19. The nonaqueous electrolyte solution secondary battery according to claim 16, wherein a ratio of the mesoporous volume to the microporous volume of the mesoporous carbon is 1.0 or more and 10 or less.

\* \* \* \* \*